United States Patent [19]
Modly

[11] Patent Number: 5,192,365
[45] Date of Patent: * Mar. 9, 1993

[54] BUFF RUTILE PIGMENT COMPOSITIONS

[75] Inventor: Zoltan M. Modly, Shaker Hts., Ohio

[73] Assignee: Engelhard Corporation, Iselin, N.J.

[*] Notice: The portion of the term of this patent subsequent to Apr. 9, 2008 has been disclaimed.

[21] Appl. No.: 711,446

[22] Filed: Jun. 6, 1991

[51] Int. Cl.$^5$ ................................................ C09C 1/36
[52] U.S. Cl. .................... 106/439; 106/436; 106/440; 106/449
[58] Field of Search ............ 106/439, 436, 440

[56] References Cited

U.S. PATENT DOCUMENTS

| | | | |
|---|---|---|---|
| Re. 21,427 | 4/1940 | McKinney et al. | 134/58 |
| 3,022,186 | 2/1962 | Hund | 106/300 |
| 3,956,007 | 5/1976 | Modly | 106/428 |
| 5,006,175 | 4/1991 | Modly | 106/439 |

Primary Examiner—William R. Dixon, Jr.
Assistant Examiner—Margaret V. Einsmann
Attorney, Agent, or Firm—Renner, Otto, Boisselle & Sklar

[57] ABSTRACT

Desirable buff rutile pigment compositions are described which comprise about 40 to about 55% by weight of titanium, from about 0.4 to about 5 parts by weight of cobalt, from about 7 to about 14% by weight of tungsten, from 0.01 to about 5 parts by weight of lithium and from about 0.1 to about 20 parts by weight of cerium.

17 Claims, No Drawings

BUFF RUTILE PIGMENT COMPOSITIONS

TECHNICAL FIELD

This invention relates to buff rutile pigment compositions, and more particularly, such compositions comprising a major amount of titanium.

BACKGROUND OF THE INVENTION

Metal oxide pigments are widely used as colorants in the paint, plastics and ceramics industries and they are principally known for their chemical, thermal and weathering stabilities. While the same basic pigment compositions can be used by these industries to color the various medias ranging from complex organic polymers to glass, it is often necessary to adjust the physical properties of each pigment to meet the specifications for its successful commercial application. For example, a ceramic color is composed usually of coarser particles to minimize dissolution in the strong alkaline glazes and thereby maintain color intensity. Conversely, the paint and plastics industries prefer pigments in a relatively finely divided state to permit easy dispersion and optimize properties of gloss, brightness, strength and opacity.

For tinted paints, the necessity of introducing a separate colored pigment can in certain cases introduce weak features as far as their stability to light, heat, solvents and chemicals are concerned resulting in flotation, flocculation, recrystallization, sublimation and chalking. The use of "tinted white" or "titanate pigments" offers a way to overcome the difficulties associated with unstable tinted systems without departing from the whitening, hiding and other valuable pigmentary properties inherent in the "host" element which in this instance is titanium dioxide.

The standard procedure for preparing metal oxide pigments consists of calcining an intimate mixture of oxides or oxide precursors of primarily transition metals. Color properties develop from the formation of solid solutions containing transition metals having colored ions. Colors produced by calcining essentially white pigments with small additions of foreign elements to produce stable tinted pigments have been commercially developed over the last 30 years. For example, titanium dioxide becomes colored when calcined with minor amounts of transition metals. For tinted paints, the necessity of introducing a separate colored pigment can in certain cases introduce weak feature as far as their stability to light, heat, solvents and chemicals are concerned leading to flotation, flocculation, recrystallization, sublimation and chalking. The use of "tinted white" with unstable tinted systems without departing from the whitening, hiding and other valuable pigmentary properties inherent in the "host" element which in this case is titanium dioxide.

A large number of pigments in which the major component is a white pigment such as titanium dioxide which accepts minor additions of intensely colored metal ions to produce pastel colorants are described in U.S. Pat. No. 3,022,186. This patent describes solid solutions resulting from a large number of combinations of metal oxides or fluorides as guest components in a number of host lattices, but principally rutile titanium dioxide. The pigments prepared or disclosed in U.S. Pat. No. 3,022,186, while possessing the desired color values, are generally deficient in some physical characteristics such as texture, i.e., ease of dispersibility, gloss or opacity necessary for commercial use in the paint and plastics industries. Among the various of metals described in the '186 patent which may be added to the rutile lattice forming solid solutions are chromium, antimony, strontium, cobalt, tungsten, lithium and cerium.

Example 7 describes a reddish light brown pigment having rutile structure which is prepared by calcining a mixture of anatase, $CoCO_3$ and $H_2WO_4$. An orange pigment is prepared in Example 20 from anatase, $CoCO_3$, NiO and $H_2WO_4$. Examples 129 and 130 describe the preparation of a yellowish-whitish grey pigment from anatase or rutile, $H_2WO_4$ and LiF.

Reissue U.S. Pat. No. Re. 21,427 describes the process for forming titanium dioxide pigments by combining the titanium dioxide with a compound of a heavy metal. Examples of heavy metals listed in Col. 1, lines 21-25 include vanadium, chromium, iron, cobalt, nickel, manganese and copper.

U.S. Pat. No. 3,956,007 describes antimony-free yellow pigments prepared by calcining anatase with a specified amount of nickel, tungsten, zinc, lithium, cerium and magnesium compounds.

U.S. Pat. No. 5,006,175 describes high infra red reflectory brown rutile pigments comprising a solid solution of titanium dioxide containing within the rutile lattice, manganese, tungsten, lithium and cerium.

In recent years there has been increasing emphasis on developing pigments which do not contain certain metals such as antimony, chromium, arsenic, bismuth, cadmium, selenium, mercury, soluble barium, etc. Thus it is desirable to produce buff pigments which are free of such metals and which have the same or better qualities than the previously known pigments.

SUMMARY OF THE INVENTION

Buff rutile pigment compositions are described which comprise about 40 to about 55% by weight of titanium, from about 0.4 to about 5 parts by weight of cobalt, from about 7 to about 14% by weight of tungsten, from 0.03 to about 5 parts by weight of lithium and from about 0.1 to about 20 parts by weight of cerium.

DESCRIPTION OF THE INVENTION

The pigments of the present invention are primarily based upon titanium, cobalt and tungsten which provide the pigment with the desired buff color. The buff rutile pigments of the invention also contain smaller amounts of other metals such as cerium and lithium which provide the pigment with additional desirable properties such as texture, gloss and opacity.

The host element of the pigment compositions of the present invention is titanium dioxide which is mixed in the anatase grade or crystal structure, but which is converted to a rutile crystal structure upon calcination to a solid solution. The titanium dioxide must have particles no greater in size than about 1.5 microns, preferably no greater than about 1 micron, and, as a practical matter, at least 0.25 micron to achieve satisfactory mixing and calcining and to produce an optimum pigment for a given formulation. Such fine particle titania is commercially available, and the commercially available titania is generally of sufficient impurity to be used as purchased.

The two critical guest elements are cobalt and tungsten which are present in the solid solution as their oxides. The cobalt may be introduced as cobalt oxide but is generally added to the mixture as the hydroxide, carbonate, acetate, nitrate or formate. Cobalt carbonate is a particularly effective form for introducing the cobalt into the pigments of the invention.

The tungsten is present in the solid solution as tungstic oxide and is usually admixed as tungstic acid or ammonium meta-tungstate. The tungstic acid which is commercially available is used generally in the form of particles having a maximum size of about 5 microns and a minimum size of at least about about 1 micron.

The third guest element is lithium which is present in the solid solution as lithium oxide. Lithium generally is admixed as particles of lithium carbonate having a minimum size of about 1 micron and a maximum size of about 10 microns.

The final required guest element is cerium which appears in the solid solution as cerium oxide. The cerium is usually admixed as ceric hydrate. Commercially available ceric hydrate is of sufficient purity to be used as purchased. The cerium hydrate used in the formation of the pigments of the present invention is a powder comprising particles having a minimum size of about 0.5 micron and a maximum size of about 2 microns.

The pigments of the invention are generally prepared by adding the lithium and cerium materials to the anatase titanium dioxide, tungstic acid and cobalt carbonate mixture prior to calcination to minimize aggregation, to reduce the energy for pulverization and to improve the dispersibility of the pigment. The pigment compositions of the present invention are prepared by mixing and calcining a mixture comprising from about 68 to about 85% by weight (preferably about 75 to about 85%) of titanium dioxide, about 0.4 to about 5% by weight of cobalt (e.g., as $CoCO_3$), from about 7 to about 14% by weight of tungsten (e.g., as $H_2WO_4$), from about 0.01 to about 5% by weight of lithium (e.g., as $Li_2CO_3$), and from about 0.1 to about 20% by weight of of cerium (e.g., as $Ce(OH)_2$). The weight ratio of cobalt to tungsten generally is in the range of about 0.02 to about 0.8. Preferably the pigments are substantially free of elements such as antimony, chromium, lead, mercury, arsenic, etc.

The calcination temperature generally is from about 800° C. to about 1200° C., more often from 900° C. to 1000° C. The calcination time can be varied from about 1 to about 6 hours. Calcination can be accomplished utilizing any apparatus known in the art such as a rotary kiln, tunnel kiln, vertical calciner, high-temperature cyclone, etc.

The powdered material which is obtained as a result of the calcination step generally is pulverized to reduce the particle size range to more useful ranges. Any apparatus normally used for comminution of solid materials may be utilized including ball mills, hammer mills, etc.

One procedure for particle size reduction of the pigments of the present invention utilizes a fluid energy mill, often referred to in the art as a "jet mill". Such mills are available from, for example, Sturtevant Inc., Boston, Mass. Fluid energy mills available from Sturtevant are identified as Micronizer fluid energy mills, and these mills are capable of grinding and classifying solid powders in a single chamber wherein the particles, impelled by compressed gas, air or steam, move in high-speed rotation to grind each other by violent particle-to-particle impact. The centrifugal force keeps the over-sized material in the peripheral grinding area, and centripetal force draws the pre-selected sized finds to the center for collection. The Micronizers available from Sturtevant include production as well as laboratory size mills. The particle size of the output can be controlled by the rate of feed and the propellant pressure.

The pigments of the present invention which are ground in a fluid energy mill are characterized as having an average particle size of less than about 1.5 micron and will generally have average particle size of from about 1.0 to about 1.4 microns. These small particle pigments are found to have increased tinting strength.

It has been observed that the incorporation of lithium as lithium carbonate in the mixture prior to calcination permits calcination to less than 0.5% of the titanium dioxide as anatase at lower temperatures than when the lithium carbonate is omitted while still retaining comparatively good texture. The omission of the lithium carbonate from the mixture requires calcination of the product at a temperature of at least 25° to about 50° C. higher which has a detrimental effect on the quality. In addition, the presence of lithium results in a pigment of increased intensity.

When cerium is incorporated into the pigments of the present invention such as by the addition of ceric hydrate to the mixture prior to calcination, the tendency of the pigment to aggregate is minimized thereby enhancing tinting strength, glass, opacity and dispersibility.

In other embodiments, the cobalt to tungsten weight ratio in the pigment composition is from about 0.03:1 to about 0.6:1. In yet another embodiment, the pigment composition contains from about 40 to about 55% and preferably from about 47 to about 50% by weight of titanium as titanium oxide, at least 95% of which has the rutile crystal structure. The amount of cobalt as cobalt oxide present in the pigment may range from about 0.45 to about 4.7% by weight, and the amount of tungsten may vary between about 7.3 to about 13.9. In other embodiments, the amount of lithium present in the pigment is from about 0.01 to about 0.1, and the amount of cerium present is from about 0.2 to about 1.

In a yet further embodiment, the buff rutile pigment compositions of the present invention comprise from about 47–49% by weight of titanium as titanium dioxide, at least 99% of which has the rutile crystal structure, and said titanium dioxide contains within its structure, about 0.91 to about 2.3% by weight of cobalt, about 10.9 to about 13.1% by weight of tungsten, about 0.03–0.05% by weight of lithium, and about 0.6–0.8% by weight of cerium. The weight ratio of cobalt to tungsten in the above embodiment is from about 0.07:1 to about 0.2:1.

The following examples illustrate the buff rutile pigment compositions of the present invention and the method for preparing the pigments. Unless otherwise indicated in the following examples and elsewhere in the specification and claims, all parts and percentages are by weight, degrees are expressed as degrees Celsius, and pressure is at or near atmospheric pressure.

In the following Examples 1–7 summarized in Tables I and II, the components are dry blended and pulverized in a laboratory Waring blender for 3 minutes and calcined at about 950° C. for three hours in a Harrop gas kiln.

TABLE I

Examples 1–4

| Components | Titanium Dioxide | Cobalt Carbonate | Ammonium Meta-tungstate | Lithium Carbonate | Cerium Hydrate | Total |
| --- | --- | --- | --- | --- | --- | --- |
| Example 1 | | | | | | |
| Parts/wt | 26.67 | 3.33 | 3.33 | 0.05 | 0.33 | 33.71 |
| %/wt | 79.1 | 9.9 | 9.88 | 0.15 | 0.98 | |
| % metal | 47.5 | 4.6 | 7.2 | 0.03 | 0.78 | |
| Example 2 | | | | | | |
| Parts/wt | 26.67 | 2.5 | 4.16 | 0.05 | 0.33 | 33.71 |
| %/wt | 79.1 | 7.4 | 12.3 | 0.15 | 0.98 | |
| % metal | 47.5 | 3.4 | 9.0 | 0.03 | 0.78 | |
| Example 3 | | | | | | |
| Parts/wt | 26.67 | 1.66 | 5.0 | 0.05 | 0.33 | 33.71 |
| %/wt | 79.1 | 4.9 | 14.8 | 0.15 | 0.98 | |
| % metal | 47.5 | 2.3 | 10.8 | 0.03 | 0.78 | |
| Example 4 | | | | | | |
| Parts/wt | 26.67 | 0.83 | 5.83 | 0.05 | 0.33 | 33.71 |
| %/wt | 79.1 | 2.5 | 17.3 | 0.15 | 0.98 | |
| % metal | 47.5 | 1.1 | 12.6 | 0.03 | 0.78 | |

TABLE II

Examples 5–7

| Components | Titanium Dioxide | Cobalt Carbonate | Tungstic Acid | Lithium Carbonate | Cerium Hydrate | Total |
| --- | --- | --- | --- | --- | --- | --- |
| Example 5 | | | | | | |
| Parts/wt | 26.67 | 0.83 | 5.83 | 0.05 | 0.33 | 33.71 |
| %/wt | 79.1 | 2.5 | 17.3 | 0.15 | 0.98 | |
| % metal | 47.5 | 1.1 | 12.7 | 0.03 | 0.78 | |
| Example 6 | | | | | | |
| Parts/wt | 26.67 | 0.67 | 6.0 | 0.05 | 0.33 | 33.72 |
| %/wt | 79.1 | 2.0 | 17.8 | 0.15 | 0.98 | |
| % metal | 47.5 | 0.93 | 13.1 | 0.03 | 0.78 | |
| Example 7 | | | | | | |
| Parts/wt | 26.67 | 0.33 | 6.33 | 0.05 | 0.33 | 33.71 |
| %/wt | 79.1 | 0.98 | 18.8 | 0.15 | 0.98 | |
| % metal | 47.5 | 0.78 | 13.8 | 0.03 | 0.78 | |

EXAMPLES 8–9

In these examples the components are dry mixed and pulverized in a Waring blender for three minutes and then calcined at about 950° C. for three hours in a Harrop gas kiln. The calcined product is pulverized three times through a 0.01 herringbone screen and thereafter the particles are reduced in size in a four-inch jet mill. The components and amounts used in these examples are shown in Table III.

TABLE III

Examples 8–9

| Components | Titanium Dioxide | Cobalt Carbonate | Ammonium Meta-tungstate | Lithium Carbonate | Cerium Hydrate | Total |
| --- | --- | --- | --- | --- | --- | --- |
| Example 8 | | | | | | |
| Parts/wt | 320 | 3.0 | 50 | 0.6 | 4.0 | 404.6 |
| %/wt | 79.1 | 7.42 | 12.4 | 0.15 | 0.99 | |
| % metal | 47.5 | 3.44 | 9.10 | 0.03 | 0.79 | |
| Example 9 | | | | | | |
| Parts/wt | 320 | 20 | 60 | 0.6 | 4.0 | 404.6 |
| %/wt | 79.1 | 4.90 | 14.8 | 0.15 | 0.99 | |
| % metal | 47.5 | 2.30 | 10.9 | 0.03 | 0.79 | |

The buff rutile compositions of the present invention exhibit desirable tinting strengths, gloss and opacity comparable to buff pigments comprising titanium, antimony and chromium. The pigment compositions of the present invention can be used to color rigid vinyl polymers such as may be used for decorative building products (e.g., siding). The pigments also may be used to color a range of household products such as food containers, toys, etc. The pigments of the invention are also useful in tinting alkyd resins. The pigments of the present invention may be blended with polyvinyl chloride resins such as vinyl materials marketed by The B.F. Goodrich Chemical Company under the general trade designation "Geon". One example of such a clear vinyl polymer is Geon A5862 Natural 001 resin. The blend of pigment and polyvinyl chloride resin (containing up to about 50% by weight of pigment) may be extruded into architectural shapes such as rigid siding having a buff color.

One of the advantages of the buff rutile pigments of the present invention is that they can be prepared at lower temperatures then corresponding pigments which do not contain the cerium and lithium ions. The lower calcination temperature results in the formation of smaller particle sizes and consequently a stronger tint.

The color values of the pigments of the present invention are determined by dispersing the pigments at 15% in an alkyd resin containing 86 parts of Cargill 5114 medium oil alkyd, 13 parts of mineral spirits, 0.7 part of mixed driers and 0.3 part of an antiskinning agent. The dispersion is drawn down, dried and baked. The colors of the drawdowns were measured using a Gardner Digital Color Difference Meter Model XL-10 using illuminant A (tungstenhalogen bulb). This instrument measures the L, a, b values of the colors according to the Hunter method where:

$$L = 100(Y/Y^*)^{\frac{1}{2}}$$

$$a = \frac{Ka(X/Xo - Y/Yo)}{(Y/Yo)^{\frac{1}{2}}}$$

$$b = \frac{Kb(Y/Yo - Z/Zo)}{(Y/Yo)^{\frac{1}{2}}}$$

where X, Y, Z are tristimulus values, and X°, and Z° are tristimulus values for a perfect diffuser.

For illuminant A, the following constant values are used:

$X^* = 109.828$ $Y^* = 100.000$ $Z^* = 35.547$ $Ka = 185$ $Kb = 38$

L is called the lightness index whereas a and b are chromaticity indices. The value of L can range from $L=0$ for a black body to $L=100$ for a totally reflective body, thereby giving a measure of lightness/darkness. The value a represents the measure of red, and the value of b represents the measure of yellow. The lightness/chromaticity index (Hunter) values for various drawdowns are shown in Table IV which also includes the values for Meteor Buff 7370, a commercially available pigment from Engelhard Corporation containing Ti, Sb and Cr.

TABLE IV

| Alkyd Containing Tint of Example | Lightness-Chromaticity Index Hunter Values | | |
|---|---|---|---|
| | L | a | b |
| 1 | 41.68 | 10.90 | 16.92 |
| 2 | 41.91 | 14.82 | 17.78 |
| 3 | 40.86 | 16.17 | 22.57 |
| 5 | 57.68 | 15.56 | 25.08 |
| 6 | 60.07 | 15.09 | 25.78 |
| 7 | 68.34 | 12.32 | 26.54 |
| 8 | 45.02 | 14.92 | 19.40 |
| 9 | 50.08 | 15.84 | 22.14 |
| Meteor Buff 7370 | 63.14 | 19.98 | 32.42 |

As can be seen from the above values, the pigments of the invention generally have lower L values than the Meteor Buff which means that the colors are more intense.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. A buff rutile pigment composition comprising about 40 to about 55% by weight of titanium, from about 0.4 to about 5% by weight of cobalt, from about 7 to about 14% by weight of tungsten, from 0.01 to about 5% by weight of lithium and from about 0.1 to about 20% by weight of cerium.

2. The pigment composition of claim 1 wherein the cobalt to tungsten weight ratio is from about 0.02:1 to about 0.8:1.

3. The pigment composition of claim 1 containing from about 45 to about 50% by weight of titanium.

4. The pigment composition of claim 1 which is free of antimony and chromium.

5. The pigment composition of claim 1 wherein the titanium is present as titanium dioxide, at least 95% of which has the rutile crystal structure.

6. A buff rutile inorganic pigment composition comprising a solid solution of from about 68 to about 85% by weight of titanium dioxide, at least 99% of which has the rutile crystal structure, and said titanium dioxide contains within its structure from about 0.4 to about 5% by weight of cobalt, from about 7 to about 14% by weight of tungsten, from about 0.01 to about 5% by weight of lithium and from about 0.1 to about 20% by weight of cerium, said weight percentages being based on the total weight of solid solution.

7. The pigment composition of claim 6 wherein the cobalt to tungsten weight ratio is from about 0.02:1 to about 0.8:1.

8. The pigment composition of claim 6 containing from about 75 to about 85% by weight of the titanium dioxide.

9. The pigment composition of claim 6 wherein the cobalt is present in the solid solution in an amount of from about 0.91 to about 2.3% by weight.

10. The pigment composition of claim 6 wherein the tungsten is present in the solid solution in an amount of from about 10.9 to about 13.1% by weight.

11. The pigment composition of claim 6 which is free of antimony and chromium.

12. A buff rutile pigment composition comprising from about 45 to about 50% by weight of titanium as titanium dioxide, at least 99% which has the rutile crystal structure, and said titanium dioxide contains within its structure, about 0.91 to about 2.3% by weight of cobalt, from about 10.9 to about 13.1% by weight of tungsten, from about 0.01 to about 0.1% by weight of lithium and from about 0.2 to about 1% by weight of cerium, said weight percentages being based on the total weight of the pigment composition.

13. The pigment composition of claim 12 wherein the weight ratio of cobalt to tungsten is from about 0.07:1 to about 0.21:1.

14. The pigment composition of claim 12 containing about 48% by weight titanium as titanium dioxide.

15. The pigment composition of claim 12 containing about 0.05% by weight of lithium.

16. The pigment composition of claim 12 containing about 0.6% by weight of cerium.

17. The pigment composition of claim 12 which is free of antimony and chromium.

* * * * *